(12) United States Patent
Pack, III

(10) Patent No.: US 11,194,721 B2
(45) Date of Patent: Dec. 7, 2021

(54) INVALIDATION AND REFRESH OF MULTI-TIER DISTRIBUTED CACHES

(71) Applicant: salesforce.com, Inc., San Francisco, CA (US)

(72) Inventor: Richard Perry Pack, III, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/821,399

(22) Filed: Mar. 17, 2020

(65) Prior Publication Data

US 2020/0218658 A1 Jul. 9, 2020

Related U.S. Application Data

(63) Continuation of application No. 16/017,851, filed on Jun. 25, 2018, now Pat. No. 10,592,607, which is a continuation of application No. 15/169,568, filed on May 31, 2016, now Pat. No. 10,007,607.

(51) Int. Cl.
| | | |
|---|---|---|
| *G06F 12/08* | (2016.01) |
| *G06F 12/0831* | (2016.01) |
| *G06F 9/54* | (2006.01) |
| *G06F 12/084* | (2016.01) |
| *G06F 16/00* | (2019.01) |
| *H04L 29/08* | (2006.01) |

(52) U.S. Cl.
CPC ............ *G06F 12/0833* (2013.01); *G06F 9/54* (2013.01); *G06F 12/084* (2013.01); *G06F 16/00* (2019.01); *H04L 67/2842* (2013.01); *G06F 2212/314* (2013.01); *G06F 2212/621* (2013.01)

(58) Field of Classification Search
CPC ............ G06F 12/084; G06F 2212/621; G06F 12/0833; G06F 16/00; G06F 2212/314; G06F 9/54; H04L 67/2842
USPC .......................................................... 711/130
See application file for complete search history.

(56) References Cited

U.S. PATENT DOCUMENTS 10,212,247 B2 * 2/2019 Thilagar ............. G06F 12/0813
2007/0088700 A1 * 4/2007 Dykes ................. H04L 67/1095

* cited by examiner

*Primary Examiner* — Hua J Song
(74) *Attorney, Agent, or Firm* — Sterne, Kessler, Goldstein & Fox P.L.L.C.

(57) ABSTRACT

To deliver up-to-date, coherent user data to applications upon request, the disclosed technology includes systems and methods for caching data and metadata after it has been synchronously loaded—for future retrieval with a page load time close to zero milliseconds. To provide this experience, data needs to be stored as locally to a user as possible, in the cache on the local device or in an edge cache located geographically nearby, for use in responding to requests. Applications which maintain caches of API results can be notified of their invalidation, and can detect the invalidation, propagate the invalidation to any further client tiers with the appropriate derivative type mapping, and refresh their cached values so that clients need not synchronously make the API requests again—insuring that the client has access to the most up-to-date copy of data as inexpensively as possible—in terms of bandwidth and latency.

20 Claims, 11 Drawing Sheets

```
/***
 * The KeyAndValueProvider for the OrgService Organization SOQL query. ***/
@NonNull        814                                                 818
@Override
public GlobalCache.ValueProviderFactory<OrganizationImpl> getValueProviderFactory(@NonNull final ApiParams apiParams) {
    return new GlobalCache.ValueProviderFactory<OrganizationImpl>() {
        @Override
        public GlobalCache.ValueProvider<OrganizationImpl> getValueProvider() {
            return new AbstractRefreshableValueProvider<OrganizationImpl>() {
                @Override                 834
                protected OrganizationImpl computeValue(Date onlyIfModifiedSince, OrganizationImpl oldValue) throws ServiceException {
                    final ApiQueryResult r = apiUtil.query(SOQL);        844
                    final Record[] results = r.getRecords();
                    if (r.getSize() == 1) {
842                     apiCallContextCache.registerCall(new APICallContext(OrganizationImpl.class, apiParams));
                        return new ui.services.api.models.OrganizationImpl(results[0].get(OrganizationStandardFields.Name), results[0].getId(),
                            results[0].get(OrganizationStandardFields.NamespacePrefix),
                            results[0].get(OrganizationStandardFields.IsReadOnly));
                    } else {
                        throw new RuntimeException("Unexpected number of " + StandardEntities.Organization.getName()
                            + " records returned. Expected <1> was <" + r.getSize() + ">");
                    }
                }
            };
        }
    };
}
```

Fig. 8

INVALIDATION AND REFRESH OF MULTI-TIER DISTRIBUTED CACHES

PRIORITY APPLICATION

This application is a continuation of U.S. patent application Ser. No. 16/017,851, filed Jun. 25, 2018, which is a continuation of U.S. patent application Ser. No. 15/169,568, filed May 31, 2016, now U.S. Pat. No. 10,007,607, both of which are incorporated herein by reference in their entirety.

INTRODUCTION

As users of services load and use large web applications globally, they have different experiences due in part to bandwidth and latency differences as well as because dynamic websites have personalized content for different users and regions, and multiple types of clients use several different platforms mobile web browsers, desktop browsers, and mobile applications. To deliver up-to-date, coherent user data, systems must be able to transfer data and metadata to applications upon request.

A content delivery network (CDN) is a system of distributed servers that deliver webpages and other Web content to a user based on the geographic locations of the user, the origin of the webpage and a content delivery server. The service is effective in speeding the delivery of content of websites with high traffic and websites that have global reach. The closer the CDN server is to the user geographically, the faster the content will be delivered to the user, typically.

Servers nearest to the website visitor respond to the request. The CDN copies the pages of a website to a network of servers that are dispersed at geographically different locations, caching the contents of the page. When a user requests a webpage that is part of a content delivery network, the CDN will redirect the request from the originating site's server to a server in the CDN that is closest to the user and deliver the cached content.

A historical approach includes using cached data unless the data has changed after a time-stamped date included with the data. This approach requires a synchronous call to the originating server core (or an asynchronous call associated with a timer) to deliver any content that has not previously been cached effectively polling each tier before every use of data. As much as eighty percent of available time can be expended refreshing data in a traditional synchronous system, instead of having valid data that has already been refreshed stored and available in the cache.

Another approach that has been tried unsuccessfully for enterprise applications is to push data that has changed to the client UI. While most systems propagate changes through the system, a major challenge is that what is propagated is a projection of the change. For example, constraints on user sharing cause users to be unable to see all the data, so some users may not see a propagated change. In another example, user-specific calculations may be applied to data and those calculations do not get propagated with a change to data That is, data goes through multiple transformations as it propagates through the services.

The disclosed technology makes it possible to cache an up-to-date, coherent copy of data and metadata after the data has been synchronously loaded for future retrieval with a page load time of zero milliseconds for the data portion. For a service to provide this experience, data needs to be stored as locally to a user as possible, in the cache on the local device or in an edge cache located geographically nearby.

The technology disclosed describes systems and methods for caching derived data at an edge cache local to an edge server, for use in responding to requests from a data consuming application via an API to an application program running via the edge server, using core data as input and returning derived data. The disclosed technology includes a mechanism that allows applications which maintain caches of API results to be notified of their invalidation from the API server, and provides a system to detect the invalidation, propagate the invalidation to any further client tiers with the appropriate derivative type mapping, and refresh their values so that clients will not need to synchronously make the API requests again. The disclosed system ensures that the client at the nth tier of an enterprise system has access to the most up-to-date copy of data as inexpensively as possible— in terms of bandwidth and latency.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that, may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 5A, FIG. 58, FIG. 5C and FIG. 5D show different options for the configuration and geographic location of components of a content delivery network.

FIG. 8 shows a code snippet of an example implementation of cache refresh by generating a replay request back to core using the API parameters stored in cache for pre-caching an updated version of the impacted derived data.

DETAILED DESCRIPTION

Figure 1:
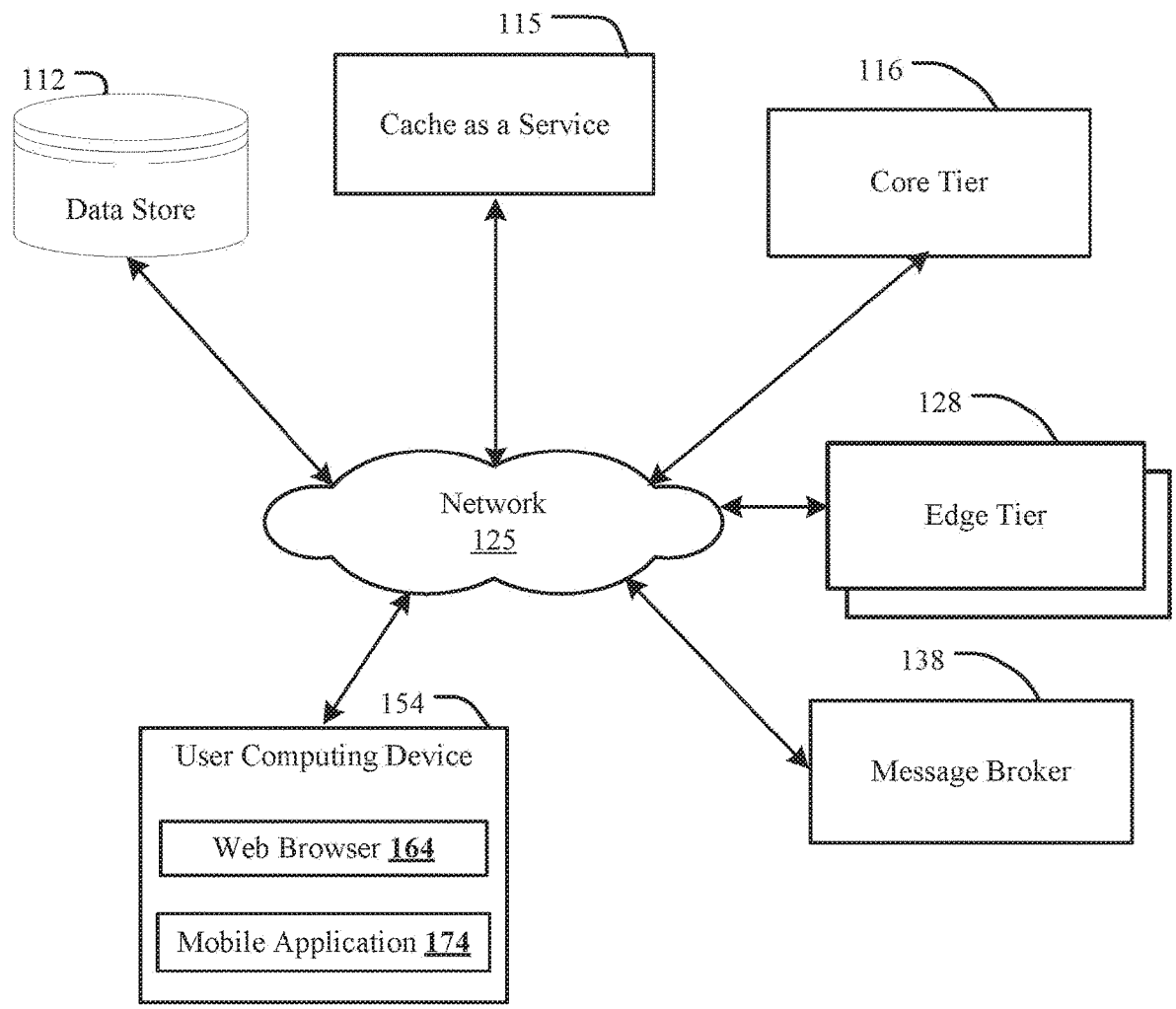
FIG. 1 illustrates one implementation of an environment for invalidation and refresh of multi-tier distributed caches.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

International call centers use content delivery network (CDN) systems of distributed servers to deliver webpages and other web content to service workers. The single source of truth data is resident in a single physical location on the planet—in what can be referred to as a core instance Modern geographical diversification motivates a need to cache data at a location based on the geographic location of the end user—a service worker who uses the webpage and a content delivery server. By moving data near to the client or edge, communication speed can be greatly improved, especially for low bandwidth, high latency connections.

Less expensive labor in some parts of the world have motivated the placement of service call centers in widely distributed geographic locations. Weak IT infrastructure in some of these locations results in large latency, due at least in part, to the distance from the tech center at which the source of truth data resides.

The disclosed technology includes methods and systems for caching derived data, enabling background refresh to speed up the appearance of apps in multi-location call centers in remote call centers. By pushing changes such as updates to cases including case resolution, the result for multiple call centers in a region receiving the same cases is that cases disappear off the screen as they are resolved, instead of the call centers needing to make synchronous calls to refresh their case lists, in one example, for a call center located in Malaysia, data for an Org can be provided from a data center located in Japan in only three seconds, while supplying responses from a data center located in CA requires ten to eleven seconds.

What is needed is to cache an up-to-date, coherent copy of data and metadata after the data has been synchronously loaded for future retrieval with a page load time of zero milliseconds for the data portion. Page load time refers to the load performance of a view in a user interface. For a service to provide this experience, data needs to be stored as locally to a user as possible, in the cache on the local device or in an edge cache located geographically nearby.

Instead of time-intensive synchronous calls to core, the disclosed technology includes a system that receives information regarding core data instances of interest and monitors and detects changes to the data instances. The system infers impact on the derived data of the changed core data instances and pre-caches an updated version of the impacted derived data by replaying affected APIs.

The system is responsive to requests and satisfies the requests for changed core data and impacted derived data using data pre-cached in the edge cache That is, the disclosed system can notify each service that has a copy of the data, of invalidation occurrences, so the service can replay the call they made to retrieve the affected data initially. By storing the context in cache for the call that was previously made, the service can retrieve an up-to-date projection, and then pass along the up-to-date projection.

Systems can run with or without edge servers, dependent in part on a system's need to handle dynamic data for geographically diverse users. Caches can be multi-tiered, such as a three tiered cache—with core caching responsive to all requests directed to clients near near data services. Those skilled in the art will understand the potential for a fourth tier. In current implementations, most edge servers have access to the core data source. The technology disclosed is usable without edge servers, and with edge servers when clients do not have their own separate caches Customization Environment FIG. 1 illustrates one implementation of environment 100 FIG. 1 shows that environment 100 can include cache as a service 115, core tier 116, edge tier 128, message broker 138, data store 112 and user computing device 154.

Cache as a service 115 includes a distributed key store and can be implemented as Redis or memcached or another general-purpose distributed memory caching system that caches data and objects to reduce the number of times an external data source must be read.

Message broker 138 can be implemented as Kafka. In a particular implementation, Apache Kafka™ is used as the invalidation message broker 138. Kafka is a distributed messaging system with a publish-and-subscribe model. As a distributed system, Kafka runs in a cluster, and each node is called a broker, which stores events in a replicated commit log. In other implementations, different messaging and queuing systems can be used.

In one implementation, core tier 116 can include an Amazon message queuing and notification service. In another implementation, core tier 116 can include a different enterprise content management system. Edge tier 128 is described in detail later, in the context of FIG. 2.

In other implementations, environment 100 may not have the same elements as those listed above and/or may have other/different elements instead of, or in addition to, those listed above. In some implementations, the modules of customization environment 100 can be of varying types including workstations, servers, computing clusters, blade servers, server farms, or any other data processing systems or computing devices. Modules can be communicably coupled to the data store via a different network connection. For example, cache as a service 115 can be coupled via the network 125 (e.g., the Internet) and core tier 116 can be coupled to a direct network link. In some implementations, an edge tier 128 may be connected via a WiFi hotspot.

In some implementations, network(s) 125 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

User computing device 154 includes a web browser 164 and/or a mobile application 174. In some implementations, user computing device 154 can be a personal computer, laptop computer, tablet computer, smartphone or other mobile device, personal digital assistant (PDA), a digital image capture device, and the like.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Cache Invalidation and Refresh

Two types of cache in common use include a session cache and an org cache. A session cache stores data for individual user sessions, lives alongside a user session, and expires when the specified time-to-live is reached or when the session expires after a set number of hours, whichever comes first. An org cache stores data that any user in an org reuses, such as the contents of navigation bars that dynamically display menu items based on user profile. Unlike a session cache, an org cache is accessible across sessions, requests, and org users and profiles, and expires when the specified time-to-live is reached. In one implementation, the cache data is kept up to date for twenty four hours since the most recent access by a user.

In one use case, upon successful execution of an API request, the results, the call and the user context for replaying the call are cached in a global cache which can be an edge cache implemented as a distributed memcached manager. When a change occurs that causes invalidation of any of the stored information in the global cache, an invalidation of the object gets generated, and the cache needs to be updated.

Cache keys are usable to store derivative types, such as API responses, in cache. Cache keys are comprised of user IDs, org IDs, Java virtual machine (JVM) and API version, as well as contextual information such as the type being cached and its attributes, in one use case. The system must be able to discover what is in cache, and it cannot query key sets. A separate cache manager compares the stored types for a user, for an organization, who made the API calls and stored the types, and generates the cache key.

In one implementation, a compression method for cache storage includes instead of storing, at the key's location, values for keys—storing a hash of the value for the key. That is, traditionally, key storage can be represented as value pairs such as key one, value one and key two, value two. In the alternative compression algorithm, storage can include key one with hash one (hash of value one) and key two with the hash of value two. If the hash for key one is the same as the hash for key two, one can deduce that the two keys store the same values. That is, if two entries hash to the same string, they must be the same value. Continuing with the alternative caching algorithm, the key for anything placed in cache is the hash. To retrieve, the system can implement a "get" call to retrieve the hash, and a second "get" call to retrieve the value.

Cache holds the user context for the API calls that were previously made. A shared cache manager monitors and detects changes to the core data instances of interest. The changes to the core data instances of interest can be communicated as an invalidation method. The invalidation method can be mapped to determine the affected APIs. After the impact map for invalidations has been generated to determine which API calls need to be replayed, the collection of values in cache can be reviewed to determine whether follow-up requests from the local cache manager for the changed core data instances and the impacted derived data can be satisfied by the shared cache manager without accessing the data source.

The disclosed technology includes caching derived data for a client cache, and satisfying the requests for the changed core data and the impacted derived data from cache memory. A shared cache manager running on a caching system receives information regarding core data instances of interest requested from a data source and regarding requests for derived data of interest. An application program running on a server accessed by a data consuming application via an application program interface (abbreviated API) receives the core data as input and returns derived data.

The shared cache manager monitors and detects changes to the core data instances of interest and infers the impact on the derived data of the changed core data instances. Changes to core data instances can be monitored by listening for invalidations of objects of interest, and inferring the impact on the derived data by mapping the invalidations to impacted APIs and resultant derived data Refresh of the cache for the affected object entities includes pre-caching an updated version of the impacted derived data by replaying the cached API calls, wrapped using the changed core data instance. The shared cache manager informs a local cache manager of the changes to the core data instances of interest and of the impact on derived data returned by at least one API. This action restores the cache contents to an up-to-date, coherent copy of data and metadata post-request (after the data has been synchronously loaded) for future retrieval with a page load time of zero milliseconds for the data—as local to the user as is feasible, in the cache on the device or in an edge server cache. The context is stored in cache for the API calls that were previously made.

Responsive to requests from the local cache manager, the shared cache manager determines whether follow-up requests from the local cache manager for the changed core data and the impacted derived data can be satisfied by the shared cache manager without accessing the data source. The shared cache manager satisfies the requests for the changed core data and the impacted derived data from cache memory.

Figure 2:
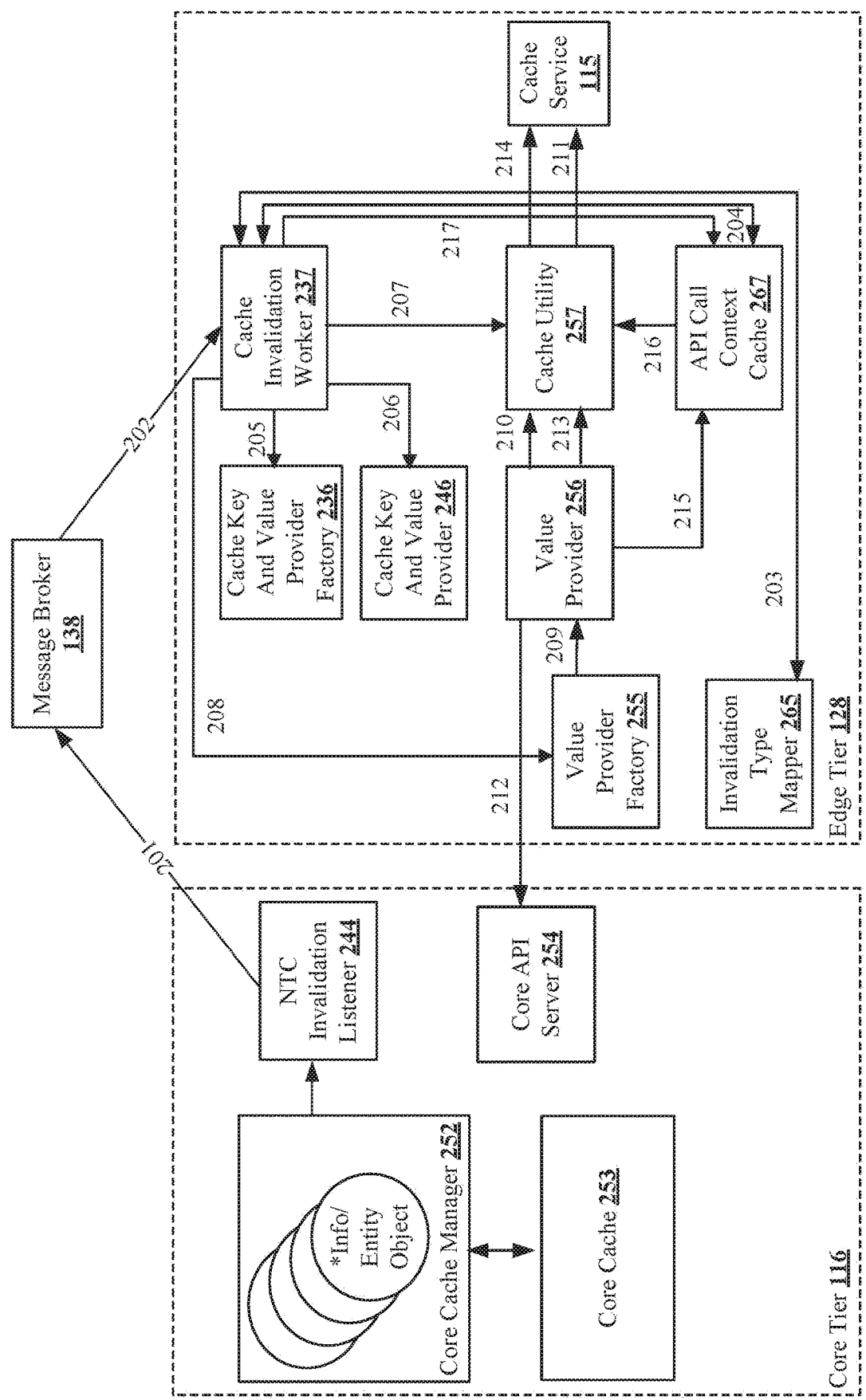
FIG. 2 shows one example block diagram of components for caching derived data.

FIG. 2 shows an example block diagram of components for caching derived data—an example environment in which invalidation notifications are detected and propagated to a client tier which implements derivative type mapping, and replays the original APIs using cached parameter and authentication values, to refresh invalidated cache values so that clients will not need to synchronously make the API requests again.

Figure 3:
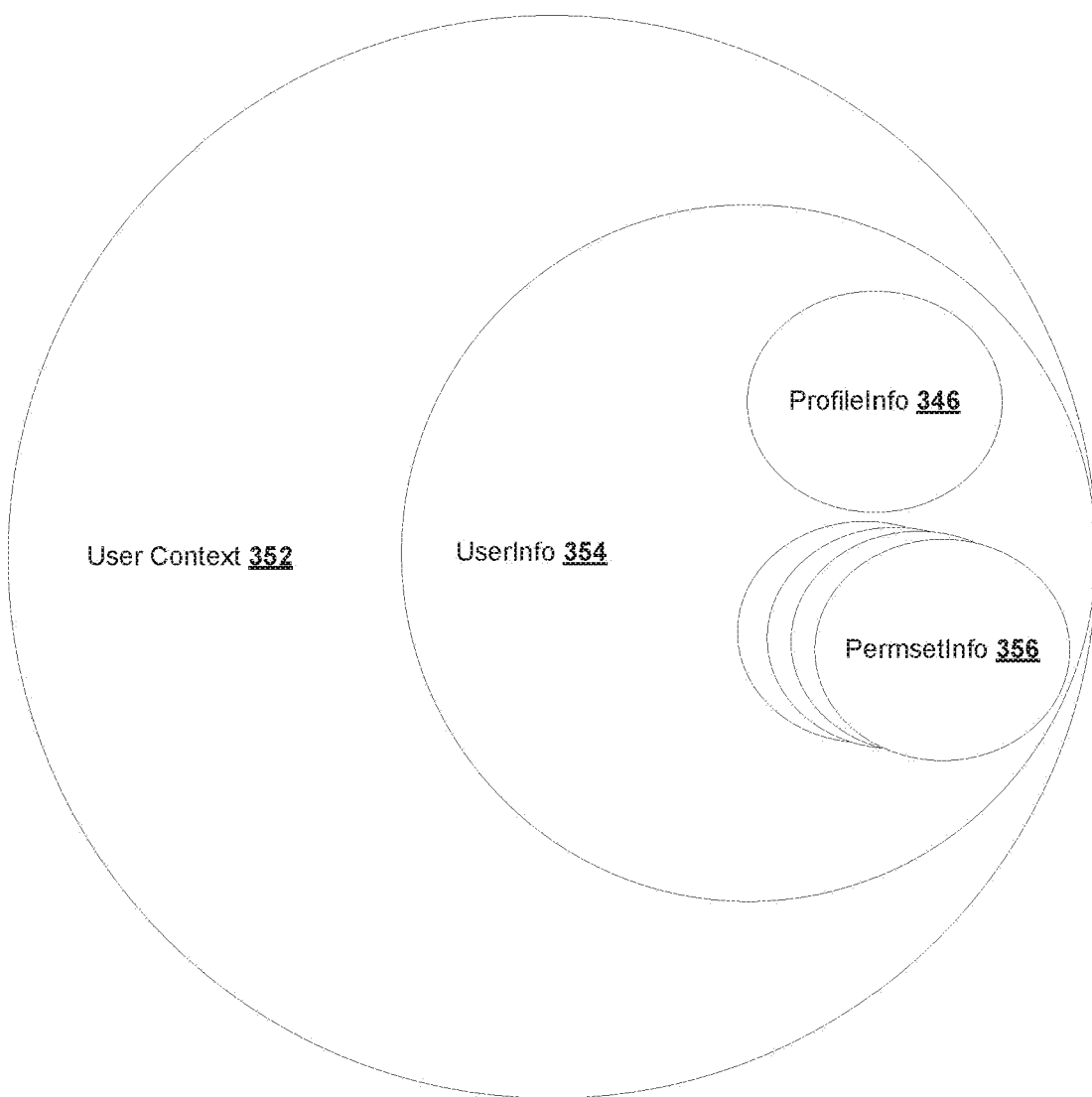
FIG. 3 shows an example user context for caching.

Core tier 116 includes a core cache manager 252, which manages information about a group of entity objects stored in core cache 253, and a non-transactional cache (NTC) invalidation listener 244 which listens for invalidations of objects of interest. FIG. 3, described later, shows an example of the relative relationship of user information in use by core cache manager 252. Core tier 116 also includes core API server 254.

NTC invalidation listener 244 transmits an invalidation notification 201 to message broker 138: and message broker 138 delivers the invalidation message 202 to edge tier 128 to cache invalidation worker 237, which sends the core type of the received invalidation 203 to invalidation type mapper 265. Invalidation type mapper 265 infers the impact on the derived data of the changed core data instance by mapping the invalidated core types to their derivative API metadata types. In some implementations, an external customer API client can remotely observe changes to the core data instances of interest.

In some implementations, direct updates to raw data objects such as org info cannot be retrieved, because org info decomposes to multiple objects at the API level as it passes through the system—partially dependent on parameter settings that implement user specific projections. If anything changes in org info, then the mapper must invalidate ail of the related production types. The updated projection can be pre-cached after replaying API calls related to org info, which shapes the response or part of the derived data in the projection.

The disclosed method includes monitoring and detecting changes to the core data instances of interest, and inferring impact on the derived data of the changed core data instances T his ensures that the invalidate method invoked for any directly related info objects or indirectly related info objects (via perceived side effect such as permissions or preferences changes) stimulates refresh of the cache for the affected object entities, by replaying the cached API calls. For example, 'saves' and 'setting changes' for an underlying entity object can be detected by listening to invalidations of info objects that happen when the object's invalidate method is invoked.

Figure 4:
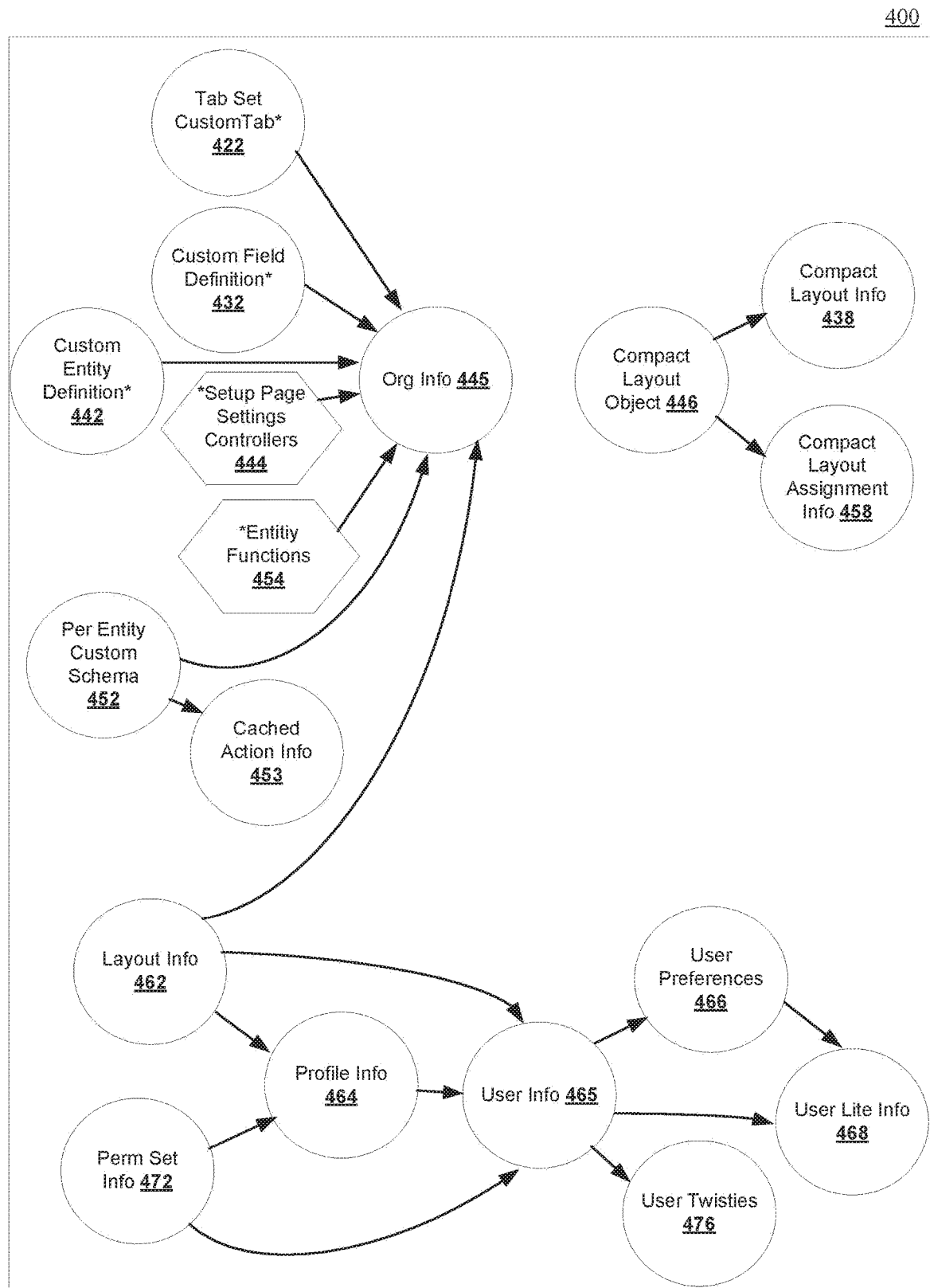
FIG. 4 shows an example directed acyclic graph for major types, showing terminal nodes of interest.

A directed acyclic graph (DAG) 400 in FIG. 4 displays a visual representation of which invalidations are of interest to listen for. The DAG represents the direction of invalidation, to make it possible to optimize (minimize) the number of invalidation messages to listen for. For one use case, DAG 400 represents the relationships between core info type invalidations for the major types. As many as eight hundred classes—including many tests and setup pages—can invalidate org info 445 DAG 400 shows a subset of the potential classes, in the graph, tab set custom tab 422, custom field definition 432, custom entity definition 442, setup page settings controllers 444, entity functions 464, per entity custom schema 462 and layout info 462 all map to org info 445. Per entity custom schema 442 also maps to cached action info 453. Compact layout object 446 maps to both compact layout info 438 and compact layout assignment info 458. Layout info 462 and perm set info 472 both map to both profile info 464 and user info 465. Profile info also maps to user info 465 in turn, user info 465 maps to user preferences 466, user lite info 468 and user twisties 476. User preferences 466 maps to user lite info 468. Note that the asterisk is a wildcard that refers to a set of related objects Twisties refer to a UI design element that shows or hides a section of a display, often indicated by an arrow that rotates 90 degrees. The optimized list of terminal nodes with core types whose invalidations are listened for, for the example use case shown in the DAG 400 are listed next. For example, if any data changes in org info, then the derived data for the APIs that relate to org info must be invalidated and updated.

Org Info
    UserLiteInfo
    UserTwisties
    CompactLayout Info
    CompactLayoutAssignmentInfo
    Cached Actioninfo Continuing the description of the block diagram in FIG. 2, for the disclosed technology, invalidation type mapper 265 infers the impact on the derived data of the changed core data instances represented by the terminal nodes listed above in this use case, and provides the API result types 204 that map to the invalidated core type. API call context cache 267 provides the API result types 204 for the mapped API result types. This includes, for the API users and the API calls the users have made, and the parameter data used for making those calls. The cached API context is usable to replay the API methods to refresh the invalidated data in the cache, in one use case. The stored context makes possible future replays of the API methods for refreshing the cache invalidated by invalidation methods received in the future.

Example API calls are listed below, for objects of interest. In the example, for core type OrgInfo or UserLiteInfo, the affected API call result types that need to be replayed include DescribeGlobals, DescribeSObject, DescribeTheme, DescribeLayout, DescribeConpactLayouts and Describe*.

OrgInfo or User LiteInfo
        DescribeGlobals
        DescribeSObject
        DescribeTheme
        DescribeLayout
        DescribeConpactLayouts
        Describe*
    CompactdLayoutInfo
        DescribeLayout
        DesribeConpactLayouts
        DescribeQuickAction
    CachedActioninfo
        DescribeLayout
        DescribeSObject For some use cases, changes to one or more of org info, user info, user preferences, layout info, profile info and permission set are monitored and detected as interest indications of core data instances and derived data of interest.

In edge tier 128, cache utility 257 manages cache services 115. For each mapped API call type from invalidation type mapper 265, cache invalidation worker 237 sends a provide( ) method call 205 with an argument siring that specifies the cached mapped API call types for which the replay request is needed, to cache key and value provider factory 236, and sends a get value provider factory method call 206 to cache key and value provider 246, which uses the API type and parameters passed in, and returns the cache key for the specified API calls. Cache invalidation worker 237 uses the returned cache key and sends a containsType( ) method 207 to cache utility 257 for determining whether follow-up requests from the local cache manager for the changed core data instances and the impacted derived data can be satisfied by the shared cache manager without accessing the data source—that is, whether the mapped type values are valid in cache. If values are no longer in cache, due to lack of use for thirty days or some other specified time to live (TTL) counter or timestamp for the data in the cache, then a replay request to refresh is not useful or needed.

When valid data is still in the cache for the mapped API type values, the cache can be refreshed by first generating a replay request back to core using the API parameters stored in cache. In this case, cache invalidation worker 237 sends the API call types 208 with the parameters retrieved from cache to value provider factory 255. An example implementation is described later, and shown in a code snippet in FIG. 8.

Value provider factory 255 wraps the API call types with the parameters from cache, creating a loader that includes the API parameters that have been pulled from cache. That is, the information needed to make a replay call is stored in the cache: the user ID, authorization token, the parameters and the type. Value provider factory 255 sends the loader 209 to value provider 256 in preparation for making the API replay query to core API server 254 on core tier 116. Value provider 256 also executes a method call 210 to update the cached parameter values via cache utility 257, which gets the values 211 from cache services 115.

Value provider 256 makes the API call 212, which is a replay of the cached calls, to core API server 254 in core tier 116—to refresh the cache for the object entities affected by the invalidation received by NTC invalidation listener 244. That is, the derived data returned by the API access using the changed core data instances, gets pre-cached as an updated version of the impacted derived data.

To close the coherency window, value provider 256 uses a put value method 213 to send the updated values to cache utility 257 for storage in cache as a service 115 via a put method 214. Value provider 256 registers the replay call 215 in API call context cache 267, including the user's authentication and related attributes for the call. This registered store makes it possible to retrieve a list of all API calls that have been made by user ID, token and attributes of calls. API call context cache 267 uses a put method 216 to update cache utility 257, and uses a put API call context method 217 to cache invalidation worker 237 to signal that the API call context cache 267 is updated—completing a cycle of invalidation and refresh.

The disclosed method of caching derived data for a client cache, including monitoring and detecting changes to the core data instances of interest, implemented using the shared cache manager described above, makes it possible for a user to view an up-to-date, coherent copy of data and metadata, with a page load time of zero milliseconds for the data portion, from the cache on the device.

A set of example relationships of user context 353 for caching are shown in FIG. 3 UserInfo 354 is loaded into cache for each user, and contains ProfileInfo 346 and PermssionSetInfo 356 which includes multiple sets of information about the effective access cheeks for a user—as defined by profiles and permission sets. In one use case, ProfileInfo 346 and PermissionSetInfo 356 can be directly derived from the database without validation on the data. When a request is made for information, the data from the profile and permission sets can be aggregated and represented by UserInfo 354. In one use case, user context 352 can include the access settings listed next.

Object Permissions (CRUD, Entity Permissions)
Field Level Security (FLS)
Page Layouts
Setup Entity Access (SEA)
   Class Definitions
   UI Page
   Connected Apps
   Custom Permissions
   Service Providers
   Tabsets (Apps)
   External Data Source
   Named Credential
   External Social Account
   Service Presence Status
   . . . etc.
IP Ranges
Login Hours
Record Type
Tab Settings
User Permissions A separate cache can be used to manage each user for a particular org, storing API calls. When a change to the core data instances of interest is detected, the cache manager can look through the stored collection of object types and the associated key affected by the invalidated core type. The cached API calls related to the invalidated core type need to be replaced. To obtain the data needed to update the cache, the edge tier needs to make a replay call of the affected API calls. The logic must be combined with state of the call—with parameters, user Id, authorization ID, and other attributes previously stored in cache. That is, the disclosed cache as a service 115 logs actions that could result in an invalidation message—who made the call, etc. After NTC invalidation listener 244 receives and propagates an invalidation message to the edge tier 128, value provider wraps and replays the API calls affected by the detected changes.

The geographical location of an edge cache is considered next. The disclosed technology for caching derived data at an edge cache local to an edge server for use in responding to requests from a data consuming application via an API running via an edge server, is further motivated by the following discussion of latency as a factor to be considered when making decisions about setup of components in a geographically dispersed system.

Figure 5A:
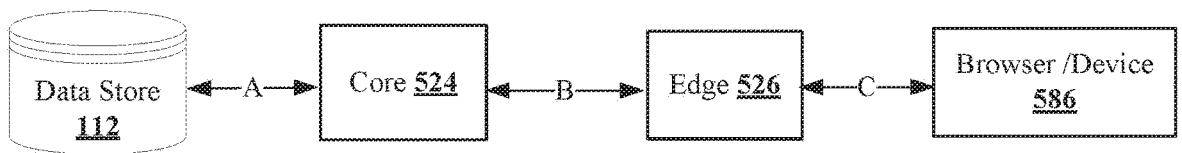
Figure 5B:
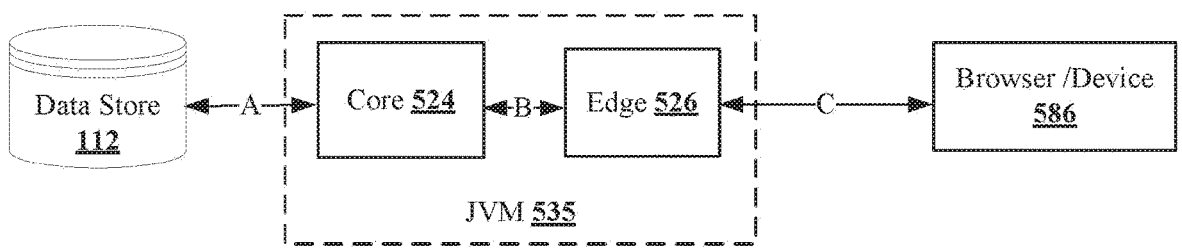
Figure 5C:
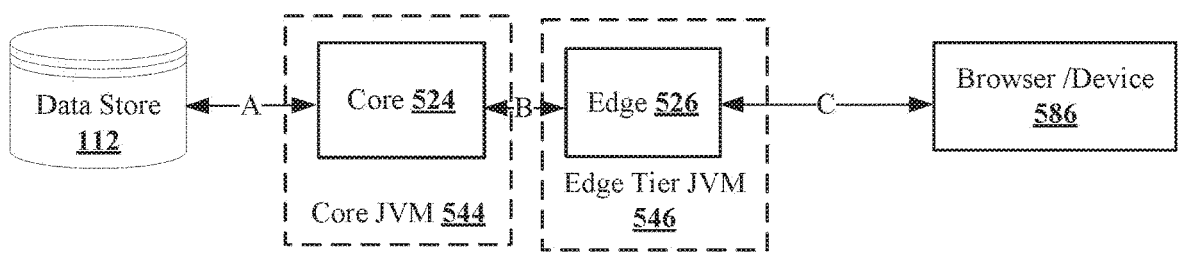

For considering latency per calk with a constant number of calls to an international enterprise data service center, FIG. 5A, FIG. 5B, FIG. 5C and FIG. 5C show different options for the configuration and geographic location of components of a content delivery network: data store 112, core 524, edge 526 and browser/device 586 connected by lines A. B and C, which denote calls to retrieve data. Available empirical measured data shows that latency for lines A, B and C are on the same order of magnitude when the relative placement of the data store 112, core 524, edge 526 and browser/device 586 is as shown in FIG. 5A.

The latency and bandwidth of B and C are of interest for FIG. 5B, in which the Java virtual machine (JVM) 535 includes both the core and edge tiers. For this discussion, consider the average page load time—the time to load a page—to be represented by the variable Y.

In FIG. 5C, B is serialized and core JVM 544 and edge tier JVM 546 represent a production setting, in one use case. For a constant number of calls, because the two tiers are located on different JVMs, the average page load time is Y plus some small constant s for the added de-serialization time: the average page load time can be represented as Y+s, when compared to the component setup in FIG. 5A.

Figure 5D:
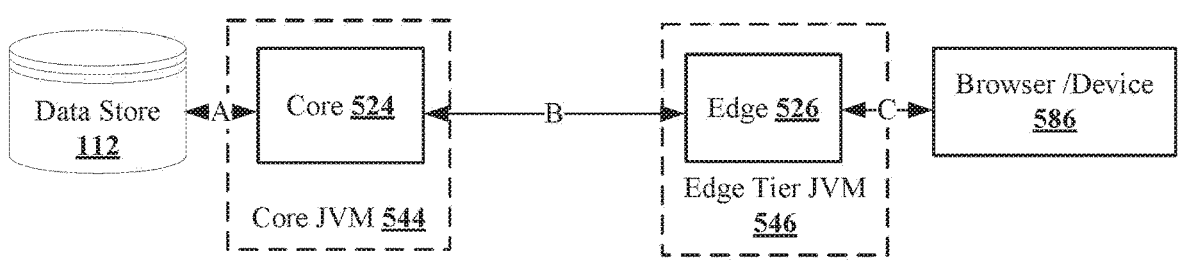

In FIG. 5D, the components are located in a long wire connection with low bandwidth and high latency, as is often experienced with geographically dispersed components. By positioning edge tier JVM 546 near the user, represented by browser/device 586, the variance of latency for C can be minimized, thus limiting the quantity of synchronous requests over lines. A and B.

Figure 6:
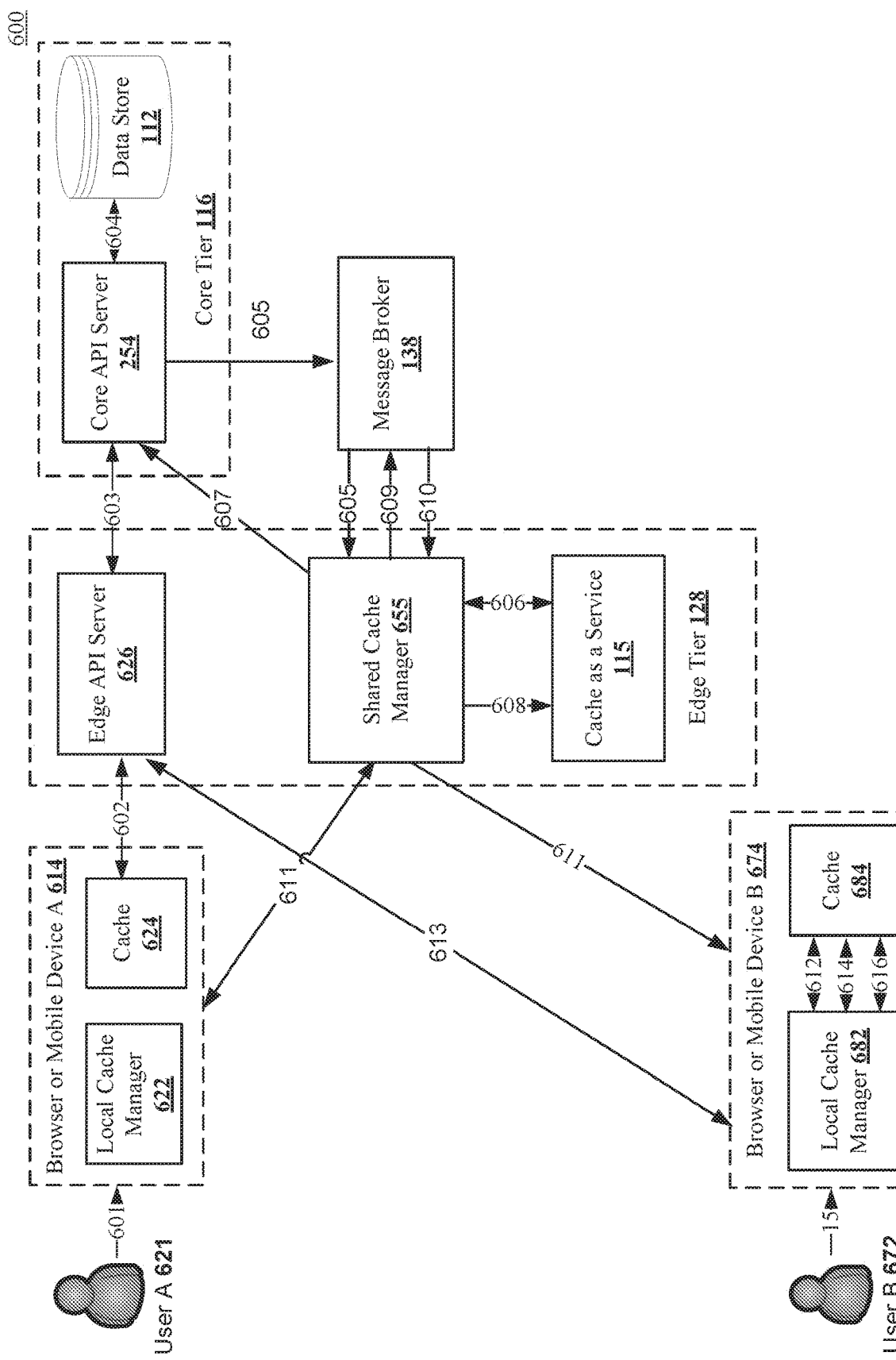
FIG. 6 shows an example use case with two users, and an edge caching system.

An example use case 600 in FIG. 6 shows two users of a system. When user A 621 makes a change to their profile, the disclosed technology for caching derived data for a client cache makes it possible for user B 672 to select user A on their display and view the change made by user A without waiting for a synchronous call to the core data store.

Using the disclosed technology, when user A 621 makes a change to add a nickname to their profile, the local cache 684 in browser or mobile device B 674 of user B 672 gets updated asynchronously, via pre-caching of an updated version of the impacted derived data, by replaying at least one API access that is dependent on the changed core data instances. If user B 672 has previously viewed the profile of user A 621 via browser of mobile device B 674, the recently added nickname added by user A 621 will be displayed the next time that user B 672 refreshes their display, with no need to wait for a data refresh from data store 112. That is, the updated profile data that includes the added nickname for user A 621 will be updated in cache 684 and available for viewing with no synchronous request to edge API server 626 for an updated profile required. Additionally, it a thousand users were following user A 621, the updated profile data that includes the added nickname of user A would also be made available to the thousand users, for viewing from the local cache of their browsers or mobile device apps with no synchronous request to edge API server 626 for an updated profile required.

The detailed description, described next, of what occurs for the example use case includes API calls and implementation details. When user A 621 adds nickname 601, the existing data for user A 621 stored in cache 684 for user B 672 is no longer valid. The profile change invalidates the existing, data for user A 621, and browser or mobile device A 614 makes art API call—user={nickname: foo} 602—to update the user's profile, to edge API server 626, which transmits an API call—user={nickname: foo} 603—to update the user to core API server 254, which updates data store 112 via. API call user={nickname: foo} 604. As described earlier, NTC invalidation listener 244 listens for invalidations of objects of interest, and message broker 138 receives an invalidation notification: invalidateMessage{OrgID, UserId, UserObject} 605, which communicates that the existing profile for user A 621 has been invalidated Message broker 138 transmits the invalidation notification, invalidateMessage{OrgID, UserID, UserObject} 605, to shared cache manager 655. Shared cache manager 655 checks to learn whether the mapped objects pointed to by the invalidate message 606 are active in cache service. If still in cache (for example, TTL has not expired), shared cache manager 655 replays the API calls in an SOQL query for the user ID 607, to core API server 254, and stores the API call results 608 in cache as a service 115. Shared cache manager 655 sends a message to the message broker to notify of the invalidation, message={list of mapped types changed} 609, and consumes the invalidation: message={list of mapped types changed} 610.

Continuing with the detailed use case description, shared cache manager 655 sends a message to the browser or mobile device B 674 to notify of the invalidation: message={list of mapped types changed} 611. Browser or mobile device B 674 checks 612 to determine if the invalidated types are in cache 684, and if still in cache, replays API call getUser{UserID} 613 to edge API Server 626. Browser or mobile device B 674 stores update API results 614 in cache 684. When user B 672 refreshes the profile page 615 for user A 621, browser or mobile device B 674 retrieves updated values 616 from local cache 684 for user A 621, and can view the new nickname added by user A 621 without waiting for results of a synchronous call to core data store 112.

Multiple Edge Tiers

Figure 7:
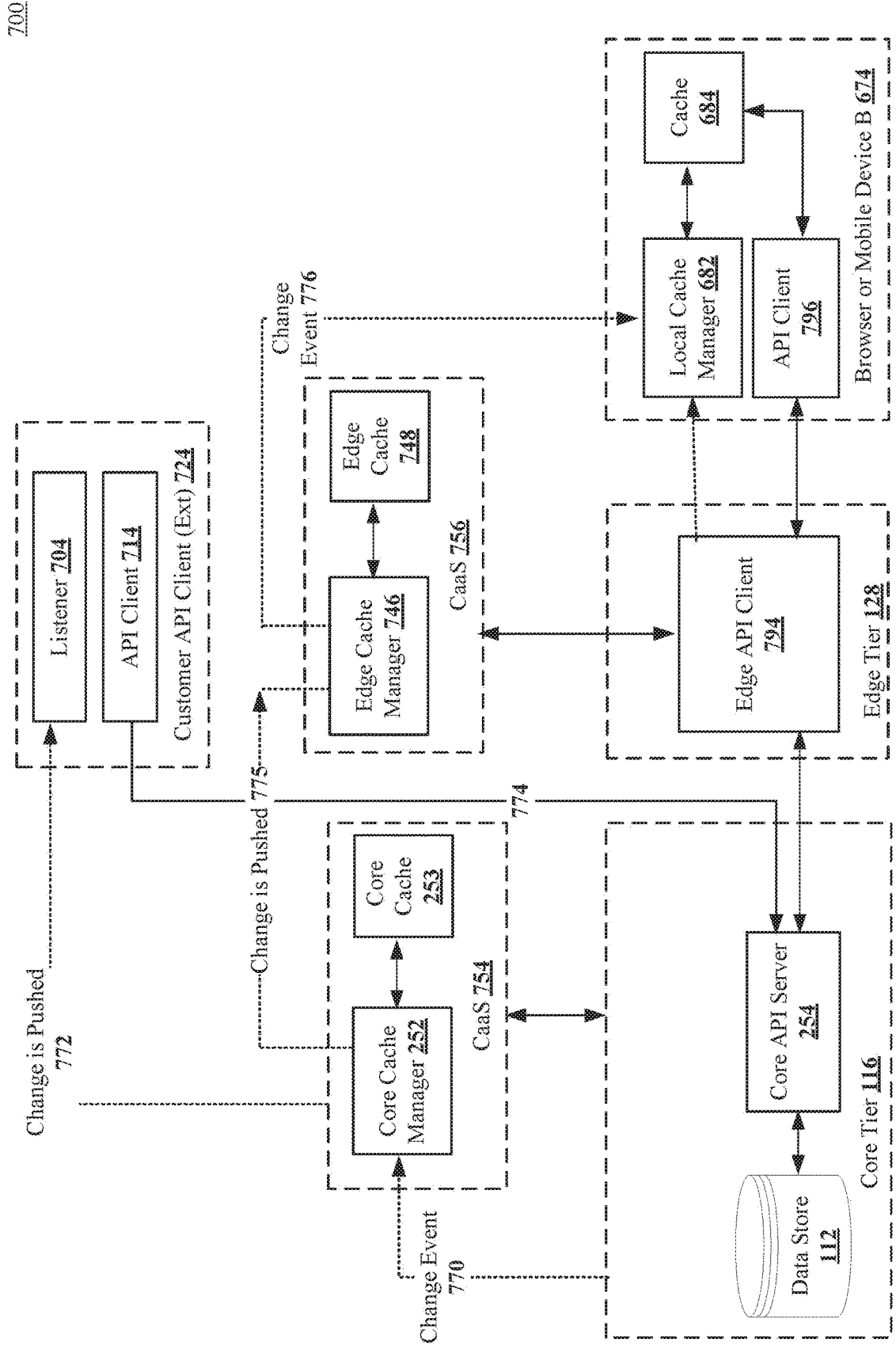
FIG. 7 shows an example block diagram that includes an external customer client, which receives cache invalidation and refresh for caching derived data.

FIG. 7 shows an example block diagram of an environment 700 that includes refreshing invalidated entries in multi-tier distributed caches. When a user opens a browser page or mobile application view, a working up-to-date copy is available locally—with an assumption of up-to-date data unless an invalidation message has been received. Environment 700 includes an external customer client which remotely monitors activity on a computer or network device—subscribing to notifications from the enterprise data center, and implementing the disclosed technology for cache invalidation and refresh.

For each hop through the tiers of environment 700 that the data makes, the disclosed technology includes a cache with a local copy of the data. When an invalidation event occurs, the disclosed system notifies each service that has a copy of the data of the invalidation occurrence, so the affected service can replay the call they made to retrieve the data initially and retrieve an up-to-date projection, and then pass along that invalidation notification to each subsequent tier. As described earlier, the context is stored in cache for the call that was previously made.

Core tier 116 in environment 700 represents an enterprise data center, with data store 112, core API server 254 and cache as a service (CaaS) 754. Core tier 116 can communicate a change event 770 to the core cache manager 252 for cache as a service 754. Core cache manager 252 can push the change 772 to listener 704 on a customer-authored app which remotely monitors activity on a computer or network device, receiving and responding to invalidation notifications. Customer-authored app with external customer API client 724 can replay invalidated API calls 774. The results of the replays are memorized-stored in CaaS 754; and the "fresh" cached results in cache 253 get returned to the user when the same inputs occur again. In turn, core cache manager 252 in CaaS 754 pushes the change 775 to the edge tier CaaS 756, to edge cache manager 746 and cache 748, which signals a change event 776 to local cache manager 682 on browser or mobile device B 674 API client 796 replays the invalidated APIs to the edge API client 794 on edge tier 128 and can retrieve up-to-date data without making a synchronous call back to the core tier 116.

Multiple instances of clients, similar to API client 796 on browser or mobile device B 674, can share a single cache service as a cluster among the clients. A very small window of time exists when an up-to-date copy of data is not available at the user device, a window of time while the data is actively being fetched. The disclosed technology ensures that a user at the nth tier has the most up-to-date copy of the data, as inexpensively as possible. As the data moves between a tier or service in the data center, all the way to the client, invalidation listeners receive notification from the previous tier that an invalidation notification has been received. Authentication tokens have a short time to live (TTL), and API refresh calls are only successful if the cached authentication token is still valid. Invalidated data is evicted from the cache service at replay time.

Figure 9:
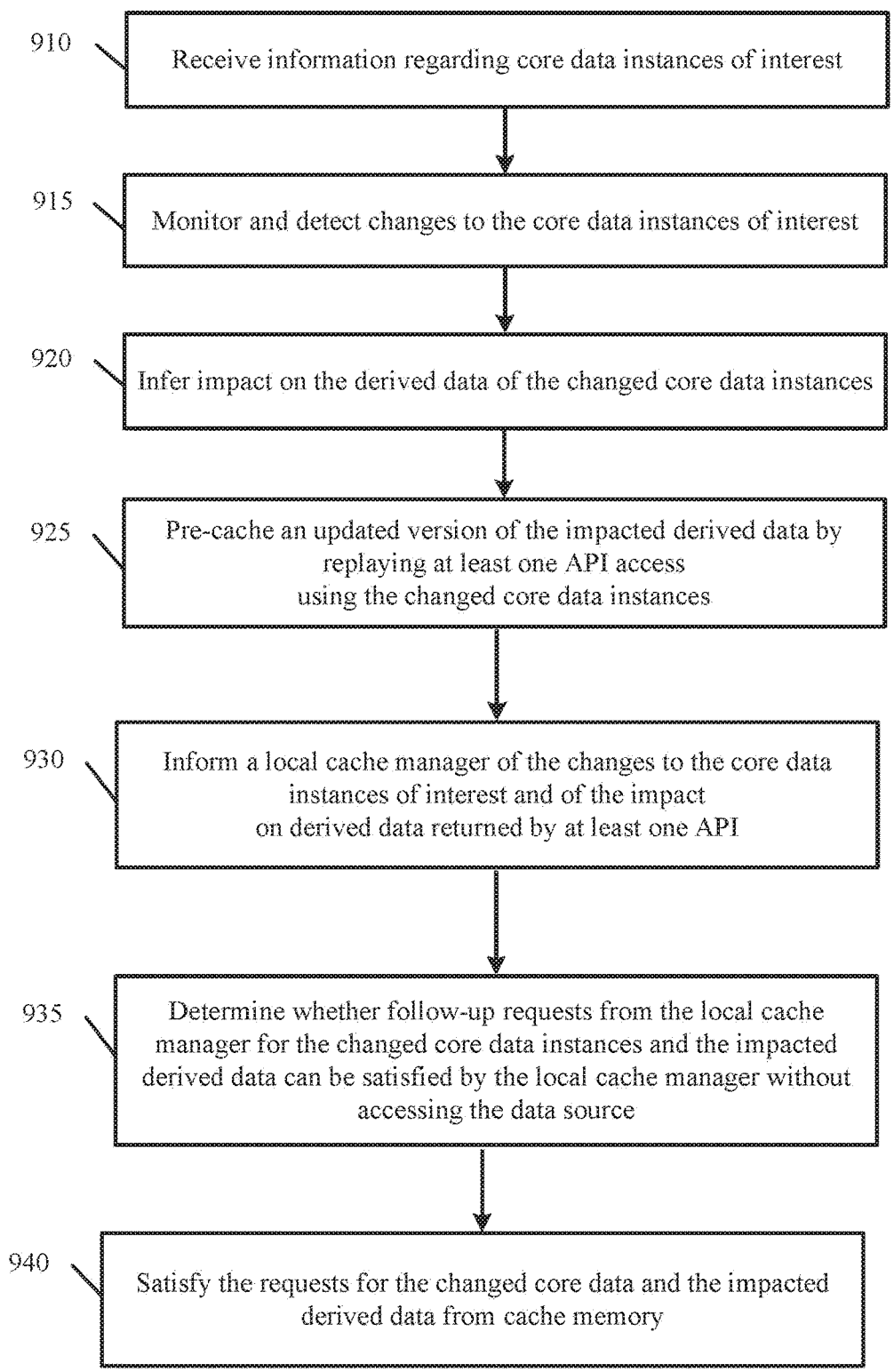
FIG. 9 is an example flow of caching derived data, for a system running on the same user device as or connected by a bus or local area network to the data consuming application.

FIG. 8 shows a code snippet 800 of an example implementation. As described earlier, API call context cache 267 provides the API call contexts for the mapped result types. This includes, for the API users and the API calls the users have made, the parameter data used for making those calls. The data and API parameters 818 get passed to the value provider factory 814. Get value provider 256 checks the cache, as described earlier. Compute value 834 makes the final query—an SOQL query 844—to core tier 116 to refresh the cache. API call context cache 842 registers the call, and stores the user ID, authorization token and the parameters in cache with a known key, so that the users who know the key can get the API calls and that the user has made. When those entries are stored in the cache, the TIL is updated, and future refreshes can be performed Implementation Workflows FIG. 9 is a flowchart 900 of one implementation of an environment for invalidation and refresh of multi-tier distributed caches via edge caching. Flowchart 900 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to a method.

At action 910 a shared cache manager, running on a caching system, receives information regarding core data instances of interest and regarding requests for derived data of interest.

At action 915, the shared cache manager monitors and detects changes to the core data instances of interest.

At action 920 the shared cache manager infers impact on the derived data of the changed core data instances.

At action 925, the shared cache manager pre-caches an updated version of the impacted derived data by replaying at least one API access that is dependent on the changed core data instances.

At action 930, the shared cache manager informs a local cache manager, running on a same user device as or connected by a bus or local area network to the data consuming application, of the changes to the core data instances of interest and of the impact on the derived data.

At action 935, the shared cache manager determines whether follow-up requests from the local cache manager for the changed core data instances and the impacted derived data can be satisfied by the local cache manager without accessing the data source.

At action 940, the shared cache manager satisfies the requests for the changed core data and the impacted derived data from cache memory.

Figure 10:
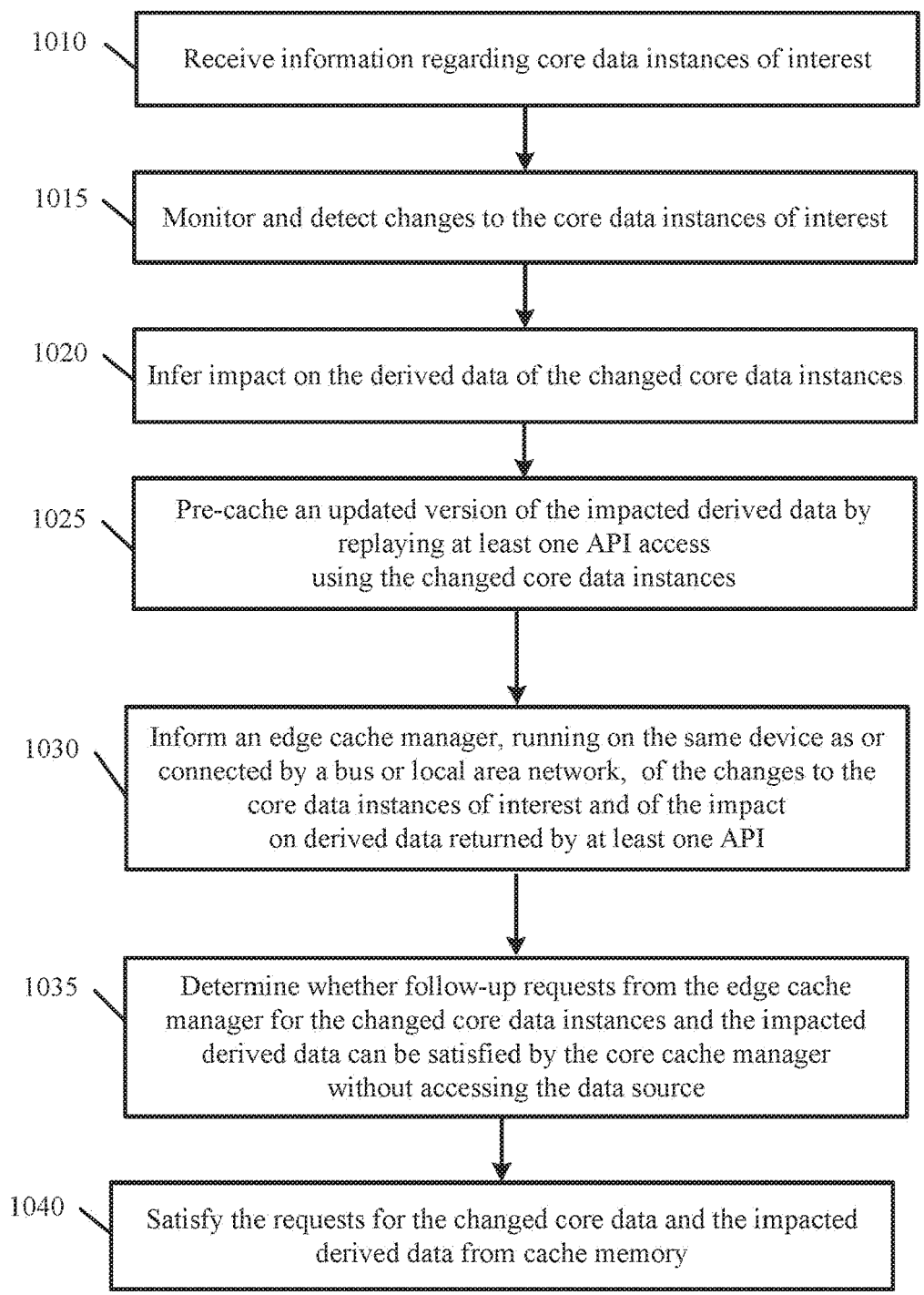
FIG. 10 is an example flow of caching derived data at an edge cache coupled to an edge server, for use in responding to requests from a data consuming application, and satisfying the requests for the changed core data and the impacted derived data from cache memory.

FIG. 10 is a flowchart 1000 of another implementation of an environment for invalidation and refresh of multi-tier distributed caches—caching derived data at an edge cache coupled to an edge server. Flowchart 1000 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 10. Multiple actions can be combined in some implementations. For convenience, this flowchart is described with reference to a method.

At action 1010 a core cache manager, running on a caching system, receives information regarding core data instances of interest and regarding requests for derived data of interest.

At action 1015, the core cache manager monitors and detects changes to the core data instances of interest.

At action 1020 the core cache manager infers impact on the derived data of the changed core data instances.

At action 1025, the core cache manager pre-caches an updated version of the impacted derived data by replaying at least one API access using the changed core data instances.

At action 1030, the s core cache manager informs an edge cache manager, running on a same user device as or connected by a bus or local area network to the data consuming application, of the changes to the core data instances of interest and of the impact on the derived data.

At action 1035, the core cache manager determines whether follow-up requests from the edge cache manager for the changed core data instances and the impacted derived data can be satisfied by the core cache manager without accessing the data source.

At action 1040, the core cache manager satisfies the requests for the changed core data and the impacted derived data from cache memory.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Multi-Tenant Integration

Figure 11:
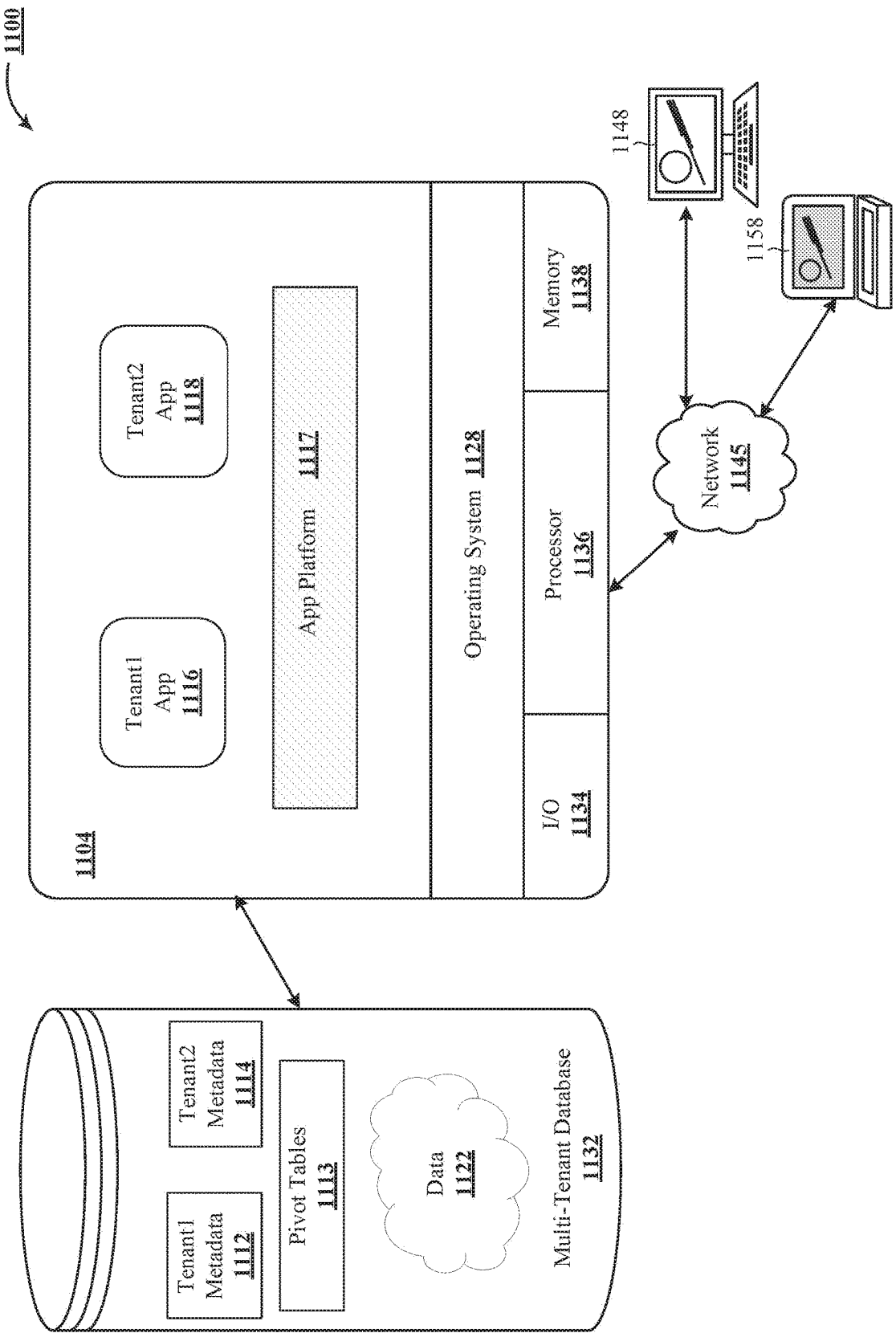
FIG. 11 shows an example computer system usable for caching derived data at an edge cache local to an edge server, for use in responding to requests from a data consuming application via an API to application program running via the edge server, using core data as input and returning derived data.

FIG. 11 presents a block diagram of an exemplary multi-tenant system 1100 suitable for invalidation and refresh of multi-tier distributed caches in environment 100 of FIG. 1. In general, the illustrated multi-tenant system 1100 of FIG. 11 includes a server 1104 that dynamically supports virtual applications 1116 and 1118, based upon data 1122 from a common database 1132 that is shared between multiple tenants, alternatively referred to herein as a "multi-tenant database". Data and services generated by the virtual applications 1116 and 1118, including GUI clients, are provided via a network 1145 to any number of client devices 1148 or 1158, as desired.

As used herein, a "tenant" or an "organization" refers to a group of one or more users that shares access to common subset of the data within the multi-tenant database 1132. In this regard, each tenant includes one or more users associated with, assigned to, or otherwise belonging to that, respective tenant Stated another way, each respective user within the multi-tenant system 1100 is associated with, assigned to, or otherwise belongs to a particular tenant of the plurality of tenants supported by the multi-tenant system 1100. Tenants may represent users, user departments, work or legal organizations, and/or any other entities that maintain data for particular sets of users within the multi-tenant system 1100. Although multiple tenants may share access to the server 1104 and the database 1132, the particular data and services provided from the server 1104 to each tenant can be securely isolated from those provided to other tenants. The multi-tenant architecture therefore allows different sets of users to share functionality and hardware resources without necessarily sharing any of the data 1122 belonging to or otherwise associated with other tenants.

The multi-tenant database 1132 is any sort of repository or other data storage system capable of storing and managing the data 1122 associated with any number of tenants. The database 1132 may be implemented using any type of conventional database server hardware. In various implementations, the database 1132 shares processing hardware with the server 1104. In other implementations, the database 1132 is implemented using separate physical and/or virtual database server hardware that communicates with the server 1104 to perform the various functions described herein. The multi-tenant database 1132 may alternatively be referred to herein as an on-demand database, in that the multi-tenant database 1132 provides (or is available to provide) data at run-time to on-demand virtual applications 1116 or 1118 generated by the application platform 11111, with tenant1 metadata 1112 and tenant2 metadata 1114 securely isolated.

In practice, the data 1122 may be organized and formatted in any manner to support the application platform. In various implementations, conventional data relationships are established using any number of pivot tables 1113 that establish indexing, uniqueness, relationships between entities, and/or other aspects of conventional database organization as desired.

The server 1104 is implemented using one or more actual and/or virtual computing systems that collectively provide the dynamic application platform 1117 for generating the virtual applications. For example, the server 1104 may be implemented using a cluster of actual and/or virtual servers operating in conjunction with each other, typically in association with conventional network communications, cluster management, load balancing and other features as appropriate. The server 1104 operates with any sort of conventional processing hardware such as a processor 1136, memory 1138, input/output devices 1134 and the like. The input/output devices 1134 generally represent the interfaces) to networks (e.g., to the network 1145, or any other local area, wide area or other network), mass storage, display devices, data entry devices and/or the like User interface input devices 1134 can include a keyboard, pointing devices such as a mouse, trackball, touchpad, or graphics tablet; a scanner; a touch screen incorporated into the display, audio input devices such as voice recognition systems and microphones; and other types of input devices. In general, use of the term "input device" is intended to include possible types of devices and ways to input information into computer system 1117.

User interface output devices can include a display subsystem, a printer, a fax machine, or non-visual displays such as audio output devices. The display subsystem can include a cathode ray tube (CRT), a flat-panel device such as a liquid crystal display (LCD) or LED display, a projection device, or some other mechanism for creating a visible image. The display subsystem can also provide a non-visual display such as audio output devices. In general, use of the term "output device" is intended to include all possible types of devices and ways to output information from processor 1136 to the user or to another machine or computer system.

The processor 1136 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1138 represents any non-transitory short or long term storage or other computer-readable media capable of storing programming instructions for execution on the processor 1136, including any sort of random access memory (RAM), read only memory (ROM), flash memory, magnetic or optical mass storage, and/or the like and can include Redis or memcached or another general-purpose distributed memory caching system that caches data and objects to reduce the number of times an external data source must be read. The computer-executable programming instructions, when read and executed by the server 1104 and/or processor 1136, cause the server 1104 and/or processor 1136 to create, generate, or otherwise facilitate the application platform 1117 and/or virtual applications 1116 and 1118, and perform one or more additional tasks, operations, functions, and/or processes described herein. It should be noted that the memory 1138 represents one suitable implementation of such computer-readable media, and alternatively or additionally, the server 1104 could receive and cooperate with external computer-readable media that is realized as a portable or mobile component or application platform, e.g., a portable hard drive, a USB flash drive, an optical disc, or the like.

The application platform 1117 is any sort of software application or other data processing engine that generates the virtual applications 1116 and 1118 that provide data and/or services to the client devices 1148 and 1158. In a typical implementation, the application platform 1117 gains access to processing resources, communications interfaces and other features of the processing hardware using any sort of conventional or proprietary operating system 1128. The virtual applications 1116 and 1118 are typically generated at run-time in response to input received from the client devices 1148 and 1158.

With continued reference to FIG. 11, the data and services provided by the server 1104 can be retrieved using any sort of personal computer, mobile telephone, tablet or other network-enabled client device 1148 or 1158 on the network 1145. In an exemplary implementation, the client device 1148 or 1158 includes a display device, such as a monitor, screen, or another conventional electronic display capable of graphically presenting data and/or information retrieved from the multi-tenant database 1132

In some implementations, network(s) 1145 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplar) implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

Some particular implementations and features are described in the following discussion.

In one implementation, a method is disclosed for caching derived data, including a shared cache manager, running on a caching system, receiving information regarding core data instances of interest requested from a data source and regarding requests for derived data of interest, wherein at least one application program running on a server accessed by a data consuming application via an application program interface (abbreviated API) receives the core data as input and returns the derived data. The shared cache manager monitors and detects changes to the core data instances of interest; infers impact on the derived data of the changed core data instances; pre-caches an updated version of the impacted derived data by replaying at least one API access that is dependent on the changed core data instances; and informs a local cache manager, running on a same user device as or connected by a bus or local area network to the data consuming application, of the changes to the core data instances of interest and of the impact on derived data returned by at least one API. The method also includes the shared cache manager, responsive to requests from the local cache manager regarding the changes to the core data instances of interest and to the impacted derived data, determining whether follow-up requests from the local cache manager for the changed core data instances and the impacted derived data can be satisfied by the shared cache manager without accessing the data source and satisfying the requests for the changed core data and the impacted derived data from cache memory. Interest in the derived data can be directly determined with respect to derived data or can be indirectly determined from the API identified as dependent on the changed core data.

This method and other implementations of the technology disclosed can include one or more of the following features and/or features described in connection with additional methods disclosed. In the interest of conciseness, the combinations of features disclosed in this application are not individually enumerated and are not repeated with each base set of features.

In some implementations, the method further includes the shared cache manager monitoring the time to live for the impacted derived data in the cache memory to determine whether the impacted derived data can be used to satisfy follow-up requests from the local cache manager. The method can also include the shared cache manager relying on an invalidation listener to monitor and detect the changes to the core data instances of interest; and the invalidation listener receiving invalidation messages reflecting changes to the core data at the data source.

For some implementations, the disclosed technology includes a method wherein the inferring of impact on the derived data includes determining from an impact map one or more API calls that use the changed core data as API input; and wherein the inferring of impact on the derived data can include determining from cache memory one or more API calls made by the data consuming application using the changed core data instances; and wherein the inferring of impact on the derived data can include using a user-specific key to access cache memory and retrieve one or more API calls made by the user's data consuming application that used the changed core data instances as API input.

In some implementations, the local cache manager runs on a mobile device. Some implementations of the disclosed technology further include the local cache manager sending API access replay requests automatically without user initiation and receiving data satisfying the requests for the changed core data and the impacted derived data cached by the shared cache manager. The disclosed method further includes the local cache manager updating its local cache memory with the received data and making updated data available for updating a display on a mobile user device.

For other implementations, a system of computing devices is disclosed that includes a data consuming application running on a user device that consumes both core data and derived data, wherein the derived data is generated by passing some of the core data to at least one application program interface (abbreviated API) and receiving the derived data in return. The disclosed system also includes a data source from which the core data is obtained; at least one application program running on a server accessed by the data consuming application via the API, wherein the application program receives the core data as input and returns the derived data; and a local cache manager, running on the same user device as or connected by a bus or local area network to the data consuming application, wherein the local cache manager refreshes a local cache of data used by the data consuming application. The disclosed system further includes a shared cache manager running on a caching system that accesses interest indications of core data instances and derived data of interest to the data consuming application; monitors and detects changes to the core data instances of interest; infers impact on the derived data of the changed core data instances; pre-caches an updated version of the impacted derived data by replaying at least one API access that is dependent on the changed core data instances; and informs the local cache manager of the changes to the core data instances of interest and of the impact on derived data returned by the at least one API. Further, the local cache manager, responsive to information from the shared cache manager regarding the changes to the core data instances of interest and to the impacted derived data, determines whether the impacted derived data is of continuing interest and, if so, replays the at least one API access with the changed core data to refresh cached derived data from the API access.

Yet another implementation may include a tangible computer readable storage medium loaded with computer instructions that, when executed, cause a shared cache manager running on a caching system to cache derived data to take actions including the shared cache manager receiving information regarding core data instances of interest requested from a data source and regarding requests for derived data of interest, wherein at least one application program running on a sewer accessed by a data consuming application via an application program interface (abbreviated API) receives the core data as input and returns the derived data. Further actions include the shared cache manager monitoring and detecting changes to the core data instances of interest, inferring impact on the derived data of the changed core data instances; pre-caching an updated version of the impacted derived data by replaying at least one API access that is dependent on the changed core data instances; and informing a local cache manager, running on the same device as or connected by a bus or local area network to the data consuming application, of the changes to the core data instances of interest and of the impact on derived data returned by the at least one API. The shared cache manager, responsive to requests from the local cache manager regarding the changes to the core data instances of interest and to the impacted derived data, determines whether follow-up requests from the local cache manager for the changed core data instances and the impacted derived data can be satisfied by the shared cache manager without accessing the data source and satisfies the requests for the changed core data and the impacted derived data from cache memory.

Some implementations of the technology include the tangible computer readable storage medium causing the shared cache manager to take actions further including the shared cache manager monitoring the time to live for the impacted derived data in the cache memory to determine whether the impacted derived data can be used to satisfy follow-up requests from the local cache manager. Other implementations of the technology include the tangible computer readable storage medium causing the shared cache manager to take actions further including the shared cache manager relying on an invalidation listener to monitor and detect the changes to the core data instances of interest; and the invalidation listener receiving invalidation messages reflecting changes to the core data at the data source; and inferring of impact on the derived data includes determining from an impact map one or more API calls that use die changed core data as API input. In some implementations, the inferring of impact on the derived data includes determining from cache memory one or more API calls made by the data consuming application using the changed core data instances. In yet other implementations, the inferring of impact on the derived data includes using a user-specific key to access cache memory and retrieve one or more API calls made by the user's data consuming application that used the changed core data instances as API input.

In one implementation, a method is disclosed for caching derived data at an edge cache coupled to an edge server, for use in responding to requests from a data consuming application via an application program interface (abbreviated API) to at least one application program running via an edge server, wherein the application program uses core data as input and returns derived data. The disclosed method of caching derived data includes a core cache manager, running on a caching system, receiving information regarding core data instances of interest requested from a data source and regarding requests for derived data of interest. The method further includes the core cache manager monitoring and detecting changes to the core data instances of interest; inferring impact on the derived data of the changed core data instances; pre-caching an updated version of the impacted derived data by replaying at least one API access that is dependent on the changed core data instances; informing an edge cache manager, running on a same device as or connected by a bus or focal area network to an edge server, that responds to requests from the data consuming application, of the changes to the core data instances of interest, and of the impact on derived data returned by the at least one API. Additionally the method includes the core cache manager, responsive to information from the data consuming application regarding the changes to core data instances of interest and to the impacted derived data, determining whether follow-up requests from the edge cache manager for the changed core data instances and the impacted derived data can be satisfied by the core cache manager without accessing the data source and satisfying the requests for the changed core data and the impacted derived data from cache memory Interest in the derived data can be directly determined with respect to derived data or can be indirectly determined from the API identified as dependent on the changed core data.

In some implementations, the method further includes the core cache manager monitoring time to live for the impacted derived data in the cache memory to determine whether the impacted derived data can be used to satisfy follow-up requests from the edge cache manager. For some implementations, the method also includes the core cache manager relying on an invalidation listener to monitor and detect the changes to the core data instances of interest; and the invalidation listener receiving invalidation messages reflecting changes to the core data at the data source. The method can also include inferring of impact on the derived data includes determining from an impact map one or more API calls that use the changed core data as API input. In other implementations, the method can include inferring of impact on the derived data includes determining from cache memory one or more API calls made by the data consuming application using the changed core data instances. In yet other implementations, the disclosed method can include inferring of impact on the derived data includes using a user-specific key to access cache memory and retrieve one or more API calls made by the user's data consuming application that used the changed core data instances as API input.

In one implementation, the disclosed method further includes a core cache API through which the core cache manager communicates with an external customer process, including the core cache manager monitoring and detecting changes to the core data instances of interest to the external customer process, inferring impact on the derived data of the changed core data instances to the external customer process; informing the external customer process of the changes to the core data instances of interest and of the impact on derived data returned by at least one API; and responsive to information regarding the changes to cone data instances of interest and to the impacted derived data, determining whether follow-up requests from the to the external customer process for the changed core data instances and the impacted derived data can be satisfied by the core cache manager without accessing the data source and satisfying the requests for the changed core data and the impacted derived data from cache memory.

For some implementations, a disclosed system of computing devices includes an edge cache that stores both core data and derived data, wherein the derived data is generated by passing some of the core data to at least one application program interface (abbreviated API) and receiving the derived data in return; a data source from which core data is obtained; at least one application program running on a server accessed via the API, wherein the application program receives the core data as input and returns the derived data, an edge cache manager, local to an edge server instance, that refreshes an edge cache of core data and derived data requested from the application program; a core cache manager running on a caching system that accesses interest indications of core data instances and derived data of interest to the edge cache manager; monitors and detects changes to the core data instances of interest; infers impact on the derived data of the changed core data instances, pre-caches an updated version of the impacted derived data by replaying at least one API access that is dependent on the changed core data instances; and informs the edge cache manager of the changes to the core data instances of interest and of the impact on derived data returned by at least one API. The edge cache manager, responsive to information from the core cache manager regarding the changes to the interesting core data and to the impact on the derived data, determines whether the impacted derived data is of continuing interest and, if so, replays at least one API access with the changed core data to refresh cached derived data from the API access.

Some implementations of the disclosed system further include the core cache manager further monitoring the time to live for the impacted derived data in the cache memory to determine whether the impacted derived data can be used to satisfy follow-up requests from the edge cache manager. Some implementations of the system further include the core cache manager relying on an invalidation listener to monitor and detect the changes to the core data instances of interest; and the invalidation listener receiving invalidation messages reflecting changes to the core data at the data source.

In some implementation of the disclosed system, the inferring of impact on the derived data includes determining from an impact map one or more API calls that use the changed core data as API input. In other implementations of the system, the inferring of impact on the derived data includes determining from cache memory one or more API calls made by the data consuming application using the changed core data instances. In yet other implementations, the inferring of impact on the derived data includes using a user-specific key to access cache memory and retrieve one or more API calls made by the user's data consuming application that used the changed core data instances as API input.

For one implementation, a disclosed system further includes a core cache API through which the core cache manager communicates with an external customer process, wherein the core cache manager further monitors and detects changes to the core data instances of interest to the external customer process, infers impact on the derived data of the changed core data instances to the external customer process; informs the external customer process of the changes to the core data instances of interest and of the impact on derived data returned by the at least one API; and responsive to information regarding the changes to core data instances of interest and to the impacted derived data, determines whether follow-up requests from the to the external customer process for the changed core data instances and the impacted derived data can be satisfied h the core cache manager without accessing the data source and satisfying requests for the changed core data and the impacted derived data from cache memory.

Yet another implementation may include a tangible computer readable storage medium loaded with computer instructions that, when executed, cause a computer system to cache derived data for a client cache, the actions including an edge cache that stores both core data and derived data, wherein the derived data is generated by passing some of the core data to at least one application program interface (abbreviated API) and receiving the derived data in return. The disclosed tangible computer readable storage medium includes a data source from which core data is obtained; at least one application program running on a server accessed via the API, wherein the application program receives the core data as input and returns the derived data; and an edge cache manager, local to an edge server instance, that refreshes car edge cache of core data and derived data requested from the application program. Additionally, tangible computer readable storage medium includes a core cache manager running on a caching system that accesses interest indications of core data instances and derived data of interest to the edge cache manager; monitors and detects changes to the core data instances of interest, infers impact on the derived data of the changed core data instances; pre-caches an updated version of the impacted derived data by replaying at least one API access using the changed core data instances; and informs the edge cache manager of the changes to the core data instances of interest and of the impact on derived data returned by the at least one API. The disclosed edge cache manager, responsive to information from the core cache manager regarding the changes to the interesting core data and to the impact on the API dependencies, determines whether the impacted API dependencies are of continuing interest and, if so, replays the impacted API dependencies of continuing interest with the changed core data to refresh cached derived data from the APIs.

In some implementations, the disclosed tangible computer readable storage medium causes the core cache manager to take actions including monitoring the time to live for the impacted derived data in the cache memory to determine whether the impacted derived data is of continuing interest. The tangible computer readable storage medium can infer the impact on the derived data includes determining from an impact map one or more API calls that use the changed core data as API input. In another implementation of the tangible computer readable storage medium, the inferring of impact on the derived data includes determining from cache memory one or more. API calls made by the data consuming application using the changed core data instances. In yet another implementation, the in of impact on the derived data includes using a user-specific key to access cache memory and retrieve one or more API calls made by the user's data consuming application that used the changed core data instances as API input. In one implementation, the tangible computer readable storage medium causes the core cache manager to take actions which further include refreshing the impacted derived data of the Changed core data instances of interest after replaying at least one API access that is dependent on the changed core data instances.

For some implementations of the disclosed tangible computer readable storage medium, the core cache manager further includes a core cache API through which the core cache manager communicates with, an external customer process, further including causing the core cache manager to monitor and detect changes to the core data instances of interest to the external customer process; infer impact on the derived data of the changed core data instances to the external customer process; inform the external customer process of the changes to the core data instances of interest and of the impact on derived data returned by at least one API; and responsive to information regarding the changes to core data instances of interest and the impacted API dependencies, determine whether follow-up requests from the to the external customer process for the changed core data instances and the impacted derived data can be satisfied by the core cache manager without accessing the data source and satisfy the requests for the changed core data and the impacted derived data from cache memory.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method, comprising:
   receiving, by a shared cache manager, a request from a data consuming application that accesses a data source;
   determining, by the shared cache manager, a cache key impacted by the request and a client device having a client-side cache that is invalidated by the request by tracking in an invalidation table one or more keys requested by the client device and comparing the cache key to the invalidation table to determine that the invalidated client-side cache is stale, wherein the one or more keys correspond to data instances at the data source; and
   causing, by the shared cache manager, a local cache manager to repair the invalidated client-side cache by sending an invalidation message to the local cache manager that indicates the cache key.

2. The method of claim 1, further comprising:
   obtaining, by the shared cache manager, an updated value from the data source using the cache key; and
   pushing, by the shared cache manager, the updated value to the local cache manager.

3. The method of claim 1, further comprising:
   obtaining, by the shared cache manager, an updated value from the data source using the cache key; and storing, by the shared cache manager, the updated value in a shared cache; and satisfying, by the shared cache manager, a second request from the local cache manager for the updated data from the shared cache.

4. The method of claim 3, wherein the shared cache is stored in memory.

5. The method of claim 1, the sending further comprising:

passing, by the shared cache manager, the invalidation message to a message broker accessible by the client device.

6. The method of claim 1, wherein the data source is a cloud database.

7. The method of claim 1, wherein the invalidation message comprises a list of mapped types.

8. A system, comprising:

a memory; and at least one processor coupled to the memory and configured to:

receive a request from a data consuming application that accesses a data source;

determine a cache key impacted by the request and a client device having a client-side cache that is invalidated by the request by tracking in an invalidation table one or more keys requested by the client device and comparing the cache key to the invalidation table to determine that the invalidated client-side cache is stale, wherein the one or more keys correspond to data instances at the data source; and cause a local cache manager to repair the invalidated client-side cache by sending an invalidation message to the local cache manager that indicates the cache key.

9. The system of claim 8, the at least one processor further configured to:

obtain an updated value from the data source using the cache key; and push the updated value to the local cache manager.

10. The system of claim 8, the at least one processor further configured to:

obtain an updated value from the data source using the cache key;

store the updated value in a shared cache; and satisfy a second request from the local cache manager for the updated data from the shared cache.

11. The system of claim 10, wherein the shared cache is stored in memory.

12. The system of claim 8, wherein to send the at least one processor is further configured to:

pass the invalidation message to a message broker accessible by the client device.

13. The system of claim 8, wherein the data source is a cloud database.

14. The system of claim 8, wherein the invalidation message comprises a list of mapped types.

15. A non-transitory computer-readable device having instructions stored thereon that, when executed by at least one computing device, causes the at least one computing device to perform operations comprising:

receiving a request from a data consuming application that accesses a data source;

determining a cache key impacted by the request and a client device having a client-side cache that is invalidated by the request by tracking in an invalidation table one or more keys requested by the client device and comparing the cache key to the invalidation table to determine that the invalidated client-side cache is stale, wherein the one or more keys correspond to data instances at the data source; and causing a local cache manager to repair the invalidated client-side cache by sending an invalidation message to the local cache manager that indicates the cache key.

16. The non-transitory computer-readable device of claim 15, the operations further comprising:

obtaining an updated value from the data source using the cache key; and pushing the updated value to the local cache manager.

17. The non-transitory computer-readable device of claim 15, the operations further comprising:

obtaining an updated value from the data source using the cache key;

storing the updated value in a shared cache; and satisfying a second request from the local cache manager for the updated data from the shared cache.

18. The non-transitory computer-readable device of claim 15, the operations further comprising:

passing the invalidation message to a message broker accessible by the client device.

19. The non-transitory computer-readable device of claim 15, wherein the data source is a cloud database.

20. The non-transitory computer-readable device of claim 15, wherein the invalidation message comprises a list of mapped types.

* * * * *

UNITED STATES PATENT AND TRADEMARK OFFICE
CERTIFICATE OF CORRECTION

PATENT NO. : 11,194,721 B2
APPLICATION NO. : 16/821399
DATED : December 7, 2021
INVENTOR(S) : Richard Perry Pack, III et al.

Page 1 of 1

It is certified that error appears in the above-identified patent and that said Letters Patent is hereby corrected as shown below:

On the Title Page

Item (63), "Continuation of application No. 16/017,851, filed on Jun. 25, 2018, now Pat. No. 10,592,607, which is a continuation of application No. 15/169,568, filed on May 31, 2016, now Pat. No. 10,007,607." should read --Continuation of application No. 16/017,851, filed on Jun. 25, 2018, now Pat. No. 10,592,413, which is a continuation of application No. 15/169,568, filed on May 31, 2016, now Pat. No. 10,007,607.--.

Item (57), Abstract "requests again – insuring that" should read --requests again – ensuring that--.

Signed and Sealed this
Twenty-seventh Day of June, 2023

Katherine Kelly Vidal
*Director of the United States Patent and Trademark Office*